(12) United States Patent
Lowry et al.

(10) Patent No.: US 11,227,379 B2
(45) Date of Patent: Jan. 18, 2022

(54) INSPECTION AND IMAGING SYSTEM AND METHOD OF USE

(71) Applicant: THE BOEING COMPANY, Chicago, IL (US)

(72) Inventors: Brian C. Lowry, Turkey City, PA (US); Stephen Ziegenfuss, Jackson, MI (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/839,730

(22) Filed: Apr. 3, 2020

(65) Prior Publication Data
US 2021/0304390 A1 Sep. 30, 2021

Related U.S. Application Data

(60) Provisional application No. 62/994,461, filed on Mar. 25, 2020.

(51) Int. Cl.
| | |
|---|---|
| *H04N 5/247* | (2006.01) |
| *H04N 5/232* | (2006.01) |
| *G06T 3/40* | (2006.01) |
| *G06T 7/00* | (2017.01) |
| *B64F 5/60* | (2017.01) |

(52) U.S. Cl.
CPC .............. *G06T 7/0004* (2013.01); *B64F 5/60* (2017.01); *G06T 3/4053* (2013.01); *H04N 5/23212* (2013.01); *H04N 5/23296* (2013.01); *H04N 5/247* (2013.01); *G06T 2207/10024* (2013.01); *G06T 2207/30108* (2013.01)

(58) Field of Classification Search
CPC .................................................. G06T 7/0004
See application file for complete search history.

(56) References Cited

U.S. PATENT DOCUMENTS

| | | | | |
|---|---|---|---|---|
| 5,153,722 A | * | 10/1992 | Goedeke | G08B 17/125 169/61 |
| 5,701,704 A | * | 12/1997 | Landes | B66F 11/04 182/150 |
| 5,858,111 A | * | 1/1999 | Marrero | B60S 3/00 134/6 |
| 6,155,003 A | * | 12/2000 | Smith | E04B 1/346 52/65 |
| 6,474,027 B2 | * | 11/2002 | Nelson | B64F 1/222 296/26.04 |
| 8,930,042 B2 | * | 1/2015 | Jang | G01N 29/4472 701/2 |

(Continued)

*Primary Examiner* — Irfan Habib
(74) *Attorney, Agent, or Firm* — Womble Bond Dickinson (US) LLP

(57) ABSTRACT

An inspection system for acquiring images of an aircraft in a space is provided. The system comprises a plurality of imaging apparatuses positionable on an overhead structure in a ceiling space of an aircraft hangar, each imaging apparatus being positioned within the aircraft hangar such that each of the plurality of imaging apparatuses are configured to acquire images of sections of an aircraft positioned within the hangar, a computer system including an application viewer program configured to receive the transmitted images from each imaging apparatus, wherein the application viewer program is configured to generate a display of the acquired images of different sections of the aircraft.

20 Claims, 9 Drawing Sheets

(56) References Cited

U.S. PATENT DOCUMENTS

| | | | |
|---|---|---|---|
| 9,031,311 B2* | 5/2015 | Tillotson | G06K 9/00624 |
| | | | 382/141 |
| 9,863,839 B2* | 1/2018 | Proulx | G01M 7/027 |
| 10,681,261 B2* | 6/2020 | Hauk | G06Q 30/0623 |
| 10,834,336 B2* | 11/2020 | Coppock | B64F 5/60 |
| 10,934,023 B2* | 3/2021 | Li | G06K 9/6211 |
| 10,974,396 B2* | 4/2021 | Bartlett | B25J 5/007 |
| 11,021,136 B1* | 6/2021 | Maggiore | B60R 25/305 |
| 2012/0224058 A1* | 9/2012 | Benning | B64D 47/08 |
| | | | 348/144 |
| 2016/0260334 A1* | 9/2016 | Griffith | G08B 3/10 |
| 2018/0157455 A1* | 6/2018 | Troy | G06F 3/04842 |
| 2019/0168892 A1* | 6/2019 | Nissen | H04N 5/33 |
| 2019/0185186 A1* | 6/2019 | Li | B64F 5/60 |
| 2019/0238762 A1* | 8/2019 | Coppock | G01N 25/18 |
| 2020/0026309 A1* | 1/2020 | Ma | G05D 1/102 |
| 2020/0096328 A1* | 3/2020 | Raab | G01S 5/16 |
| 2020/0377233 A1* | 12/2020 | Harvey | B64C 39/024 |
| 2021/0264779 A1* | 8/2021 | Sandbrook | G08G 1/065 |

* cited by examiner

ANGLE OF VIEW: $\alpha = 2 \cdot \tan^{-1}\left(\dfrac{y'/2}{f}\right)$ $FOV = 2 \cdot WD \cdot \tan\left(\dfrac{\alpha}{2}\right)$

INSPECTION AND IMAGING SYSTEM AND METHOD OF USE

CROSS-REFERENCE TO RELATED APPLICATIONS

The present application claims priority to U.S. Provisional Patent Application No. 62/994,461, filed Mar. 25, 2020, the content of which is incorporated herein by reference in its entirety.

TECHNOLOGICAL FIELD

The present disclosure relates to inspection systems comprising a camera for use with aircraft, and more particularly a system for assessing an affected area of an aircraft to determine if further action is required.

BACKGROUND

This section provides background information related to the present disclosure which is not necessarily prior art. An aircraft may occasionally incur minor damage during service, where the aircraft outer surface may become scratched, buckled, or indented during operation. When an aircraft is damaged, qualified personnel with specialized training or knowledge, such as an airline mechanic, may be needed to assess the damage to the aircraft. Specifically, the airline mechanic may determine if the aircraft should be serviced immediately before further operation.

Inspecting the aircraft may cause an airline to incur significant time and expenses, which may require a qualified mechanic to travel to the aircraft in order to conduct an inspection. This requires travel related expenses and significant time for inspection to measure the damage on an aircraft, and accurately assess the damage. The inspection process presents substantial risk to both the aircraft and the mechanic, since the mechanic would need to traverse the entire crown of the aircraft. This may entail a mechanic rappelling onto the aircraft where the mechanic's weight may damage the aircraft skin, or using movable service lifts with an operator platform where the lift arms may cause damage and wouldn't enable examination of the crown. Finally, airline personnel may also need to update an aircraft maintenance database as well as a flight planning schedule in the event the airline mechanic determines that the damage needs to be repaired before further flight operation of the aircraft.

Those skilled in the art will readily appreciate that all of the above-mentioned issues may incur significant expense to the overall operations of an airline. Thus, there exists a continuing need for an improved, cost-effective approach for assessing damage to an aircraft.

BRIEF SUMMARY

This section provides a general summary of the disclosure, and is not a comprehensive disclosure of its full scope or all of its features.

According to various aspects of the present disclosure, exemplary embodiments of an inspection system is provided that comprises an imaging apparatus for acquisition of images of a section of an aircraft or vehicle within a space. The inspection system comprises a plurality of imaging apparatus positionable on an overhead structure in a ceiling space of an aircraft hangar or facility in which an aircraft or vehicle resides, each imaging apparatus being positioned such that each of the plurality of imaging apparatus are configured to acquire images of sections of an aircraft or vehicle positioned within the hangar or facility. The inspection system is further comprised of a computer system including an application viewer program, configured to receive the transmitted images from each imaging apparatus, wherein the application viewer program is configured to generate a display on a display device of the imaged acquired by each imaging apparatus of different sections of the aircraft or vehicle. The inspection system, computer system and application viewer program are configured to generate a display on a display device of the images of different sections of the aircraft or vehicle acquired by the plurality of imaging apparatus, with the images of different sections arranged relative to each other such that the images represent a merged sectional view of the aircraft or vehicle.

According to another aspect of the present disclosure, an embodiment of a method is provided for inspection and acquiring images of an aircraft within a space. An exemplary method comprises the steps of positioning a plurality of imaging apparatus on an overhead structure in a ceiling space of an aircraft hangar or facility, each imaging apparatus being positioned within the aircraft hangar or facility such that each of the plurality of imaging apparatus are configured to acquire images of different sections of an aircraft or vehicle. The method includes acquiring, by each of the plurality of imaging apparatus movably positioned on different positions on the overhead structure, images of different sections of an aircraft or vehicle within the hangar or facility, receiving, via a computer system including an application viewer program, the images acquired from each imaging apparatus, and generating via the application viewer program a display on a display device of the images of different sections of the aircraft or vehicle acquired by each imaging apparatus. The step of generating the display includes generating a display of the images of different sections of the aircraft or vehicle that are arranged relative to each other such that the images represent a merged sectional view of the aircraft or vehicle.

Further areas of applicability will become apparent from the description herein. The description and specific examples in the summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. According to various aspects of the present disclosure, embodiments are described of an inspection system is provided that comprises an imaging apparatus for acquisition of images of sections of an aircraft or vehicle. The features, functions and advantages discussed in the preceding section can be achieved independently in various embodiments or may be combined in yet other embodiments. Further aspects of the present disclosure can be seen with reference to the drawings and following described exemplary embodiments.

In exemplary embodiments of an inspection system in accordance with the present disclosure, an inspection system is provided that comprises an imaging apparatus for acquisition of images of a section of an aircraft or vehicle in a space. The inspection system comprises a plurality of imaging apparatus positionable on an overhead structure in a ceiling space of an aircraft hangar or facility, each imaging apparatus being positioned within the aircraft hangar or facility, such that each of the plurality of imaging apparatus are configured to acquire images of different sections of an aircraft or vehicle positioned within the hangar or facility. The inspection system further comprises a computer system including an application viewer program, configured to receive the transmitted images from each imaging apparatus, wherein the application viewer program is configured to generate a display on a display device of the imaged acquired by each imaging apparatus of different sections of the aircraft or vehicle. The inspection system, computer system and application viewer program are configured to generate a display on a display device of the images of different sections of the aircraft or vehicle acquired by the plurality of imaging apparatus, with the images of different sections arranged relative to each other such that the images represent a merged sectional view of the aircraft or vehicle. The inspection system, computer system and application viewer program may be configured to generate a display on a display device of the images of different sections of the aircraft acquired by the plurality of imaging apparatus along with a depiction representing an aircraft position map key indicating the different sections of the aircraft that correspond to the images of sections of the aircraft acquired by the imaging apparatus. The inspection system can also generate a single composite birds-eye view, which is useful when navigating large, monolithic areas. Using a joystick, the operator can pan, tilt, and zoom, seamlessly traversing the composited image similarly to a singular image.

Figure 1:
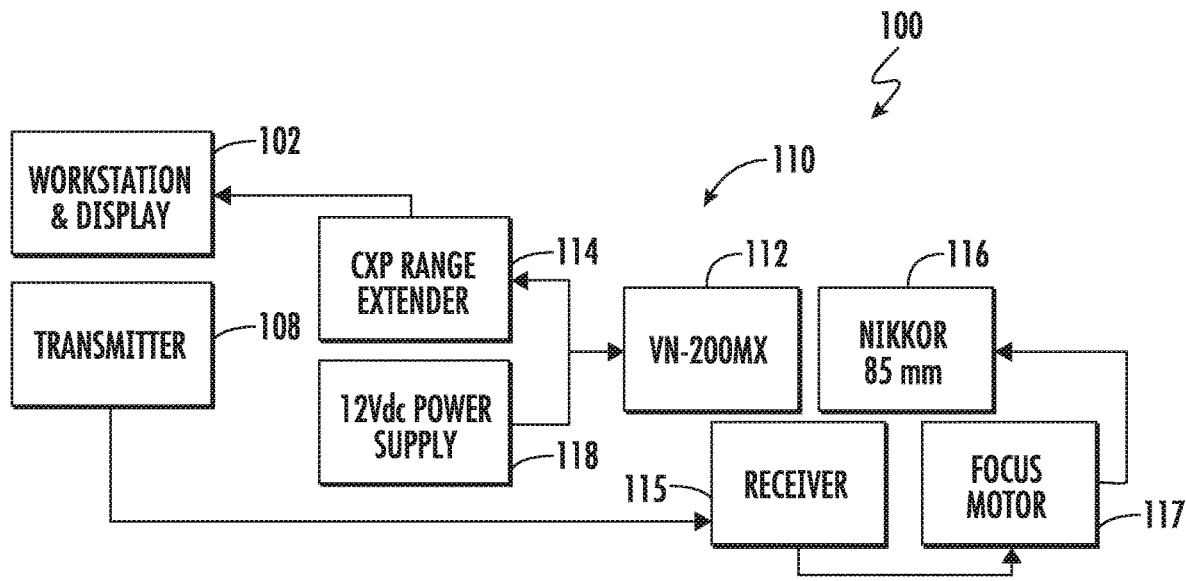
FIG. 1 is an illustration of an exemplary embodiment of an imaging apparatus of an inspection system according to the present disclosure.

Referring to FIG. 1, a block diagram of an exemplary embodiment of an aircraft inspection system 100 is provided that comprises an imaging apparatus 110 for acquisition of images of a section of an aircraft in a facility. The imaging apparatus 110 includes an imaging camera 112. The imaging apparatus 110 may include a controller 114 or integrated circuit, such as a Complementary Metal Oxide Semiconductor (CMOS) that is configured for use with digital cameras and may include a range extender component. The imaging apparatus may further include a power supply system 118 for powering the motor and controller, where image data is sent to a computer system 102 or workstation of the aircraft inspection system 100 that is in communication with a transmitter 108. The imaging apparatus 110 may include a camera having an 85 millimeter lens 116 and a motor 117 for adjusting the focus of the lens 116.

Figure 2:
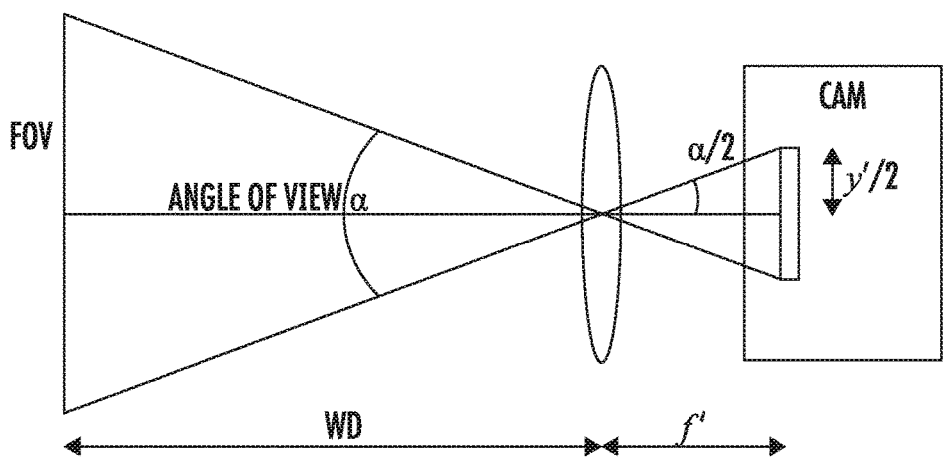
FIG. 2 is a diagram of field of view and working distance for an imaging apparatus including a camera, according to the present disclosure.

In an exemplary embodiment, the imaging apparatus preferably includes an 85 millimeter focal length lens. The focal length of the lens, which dictates the field of view (FOV) is determined by the working distance (WD) as well as the image size. This, in turn, determines the camera density (i.e., how many cameras are needed to cover an area), since a particular lens at a fixed working distance captures a fixed area or FOV, as illustrated by the diagram and formula in FIG. 2 regarding field of view and working distance, where f is the focal length.

Figure 3:
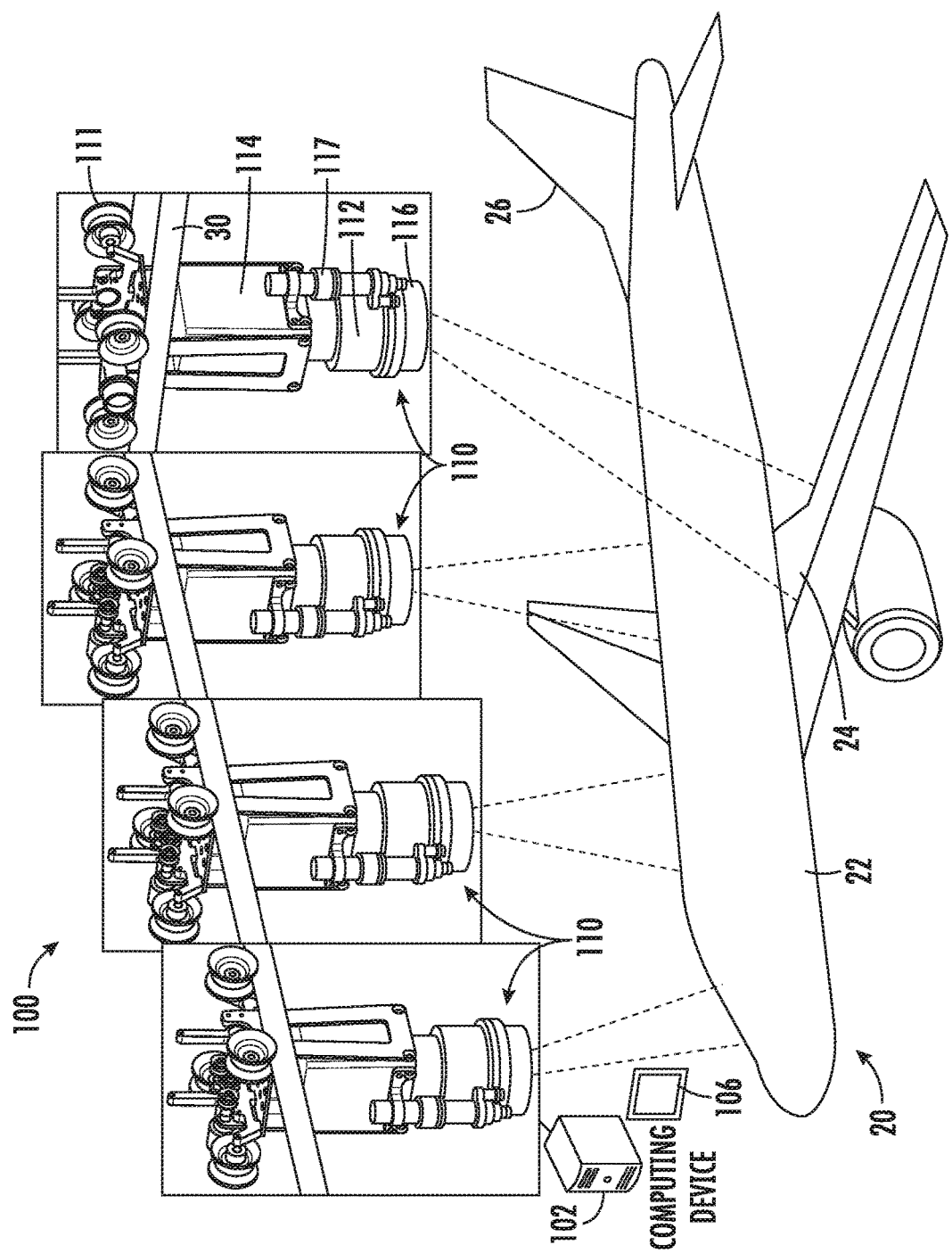
FIG. 3 is an illustration of an exemplary embodiment of an inspection system comprising a plurality of imaging apparatus according to FIG. 1, which are movably positionable relative to an overhead structure above an aircraft.

As illustrated in FIG. 3, the inspection system comprises a plurality of camera or imaging apparatus 110, each imaging apparatus 110 being coupled and movably positionable relative to an overhead structure 30 in a ceiling space of an aircraft hangar. In one example embodiment, the aircraft inspection system 100 comprises a plurality of imaging apparatus 110 movably positionable on an overhead structure 30 in a ceiling space of an aircraft hangar, each imaging apparatus 110 being mounted to a movable support 111 that is configured to be movably positioned on an overhead structure 30 such as a rafter, joist or beam in a ceiling space of a hangar. The movable support 111 may comprise a trolley assembly having a motor controlling a drive wheel to move the trolley on overhead structure and movably positioning the imaging apparatus 110 relative to the overhead structure 30 in a hangar, so that each of the plurality of imaging apparatus 110 are configured to acquire images of overlapping sections of an upper side of an aircraft 20, such as a forward section of a fuselage 22, or a section of a wing 24 or a section of a tail empennage 26. Alternatively, as shown in FIG. 3, each imaging apparatus 110 may be mounted to a movable support such as a pole 111 (or beam), which is movably positionable relative to an overhead structure 30 (e.g., a rafter or joist beam) in a ceiling space in a hangar, such that the imaging apparatus 110 can be adjustably positioned relative to an aircraft 20 in the hangar.

Figure 4:
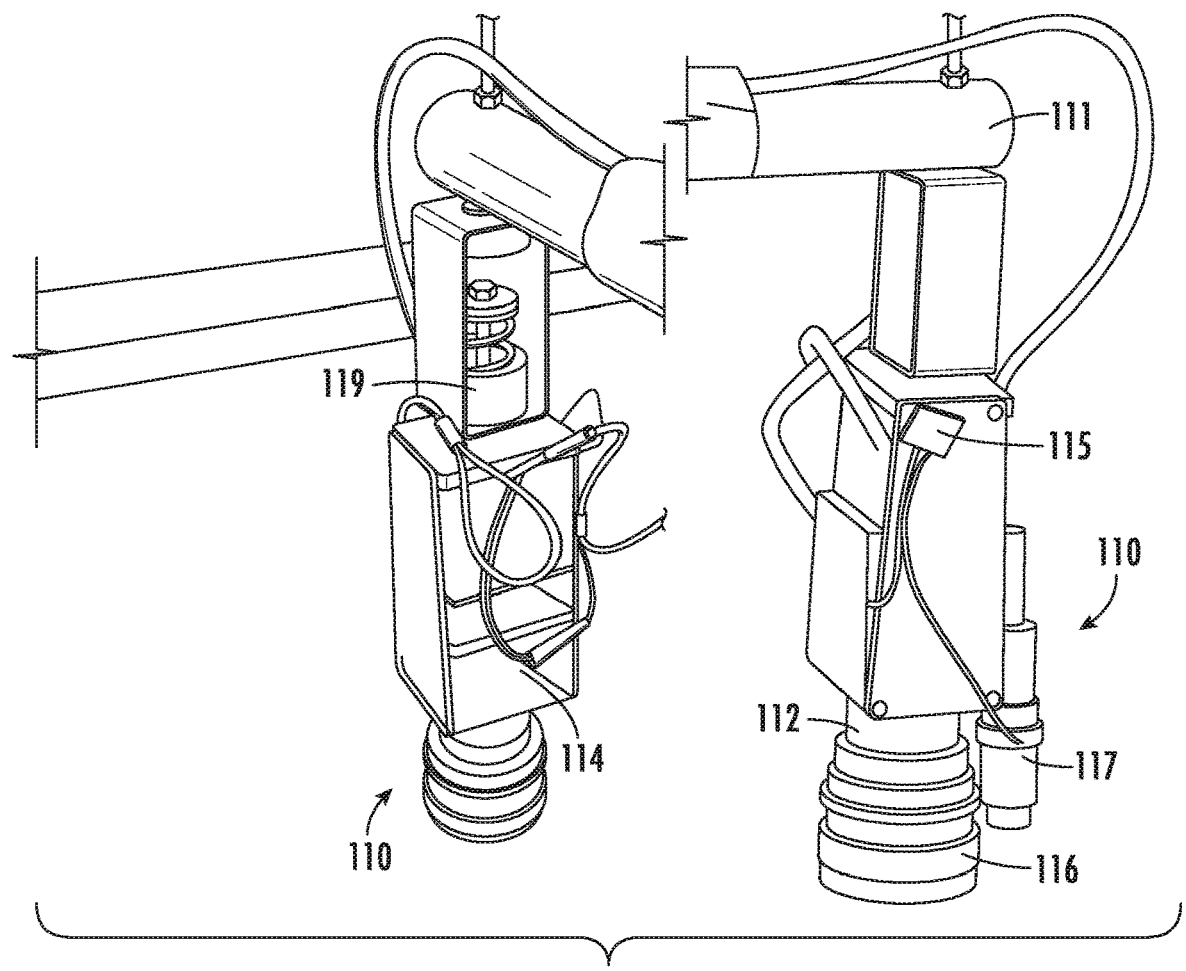
FIG. 4 is an illustration of an exemplary imaging apparatus that is movably positionable relative to an overhead structure above an aircraft, in accordance with an inspection system shown in FIGS. 1-2.

As illustrated in FIG. 4, the imaging apparatus 110 depicted in FIG. 3 may be secured to a movable support 111 (such as a pole) for movably positioning the imaging apparatus 110 relative to the overhead structure 30, such as a beam or rafter in a ceiling space of an aircraft hangar 32. The imaging apparatus 110 are preferably mounted in a ceiling space of an aircraft hangar 32, at a predetermined height above the floor level of the hangar 32 in which an aircraft 20 is positioned, which may be in the range of 50 to 70 feet above the floor of the hangar 32. In one example embodiment in accordance with the present disclosure, the aircraft inspection system 100 comprises four camera or imaging apparatus 110 as shown in FIG. 3, which are mountable by movable supports 111 to the overhead structure 30 within a ceiling space of a hangar 32 or facility in which an aircraft 20 or other vehicle may be positioned. Each of the imaging apparatus 110 are moveably mounted and positionable relative to the overhead structure 30 and relative to each other, so as to capture overhead images of sections of an aircraft 20 that is taxied into and positioned in the hangar 32, as shown in FIGS. 3-4. Each of the imaging apparatus 110 are preferably assembled to a movable support 111, such that the imaging apparatus 110 are able to be moved to acquire images of sections of the aircraft 20 from overhead or above the aircraft 20. Each imaging apparatus 110 includes a controller such as a microprocessor and/or integrated circuit. The controller may include a CSP range extender 114, power supply 118, and a receiver 115 (or transceiver) for receiving and transmitting wireless signals between the imaging apparatus 110 and computer system 102 of the aircraft inspection system 100.

Figure 5:
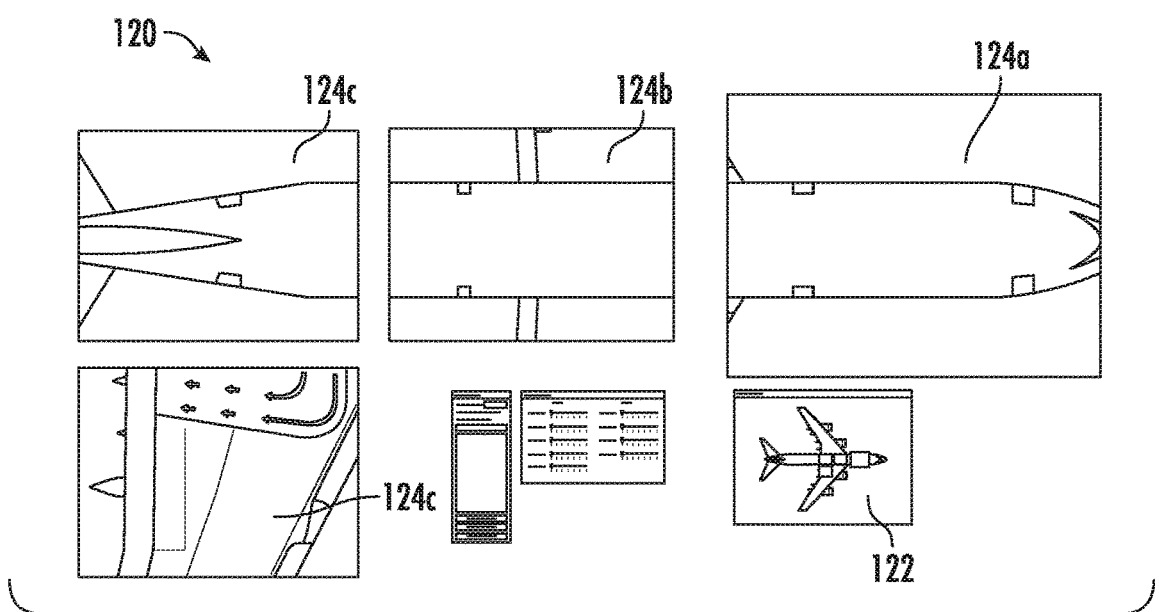
FIG. 5 is an illustration of an aircraft inspection system display of the images from the imaging apparatus arranged to represent a sectional view of the aircraft.

In the embodiment shown in FIGS. 3-4, the imaging apparatus 110 are moveably positionable relative to an overhead structure 30, where the four or more imaging apparatus 110 are positioned at a predetermined spacing relative to each other such that a minimum amount of overlap exists in the images that each camera or imaging apparatus 110 acquires. The imaging apparatus 110 are configured to be positioned at a minimum spacing relative to each other such that each of the respectively positioned imaging apparatus 110 are configured to acquire images of different overlapping sections of an upper side of an aircraft 20 such as a section of a fuselage 22 or a wing 24 where each imaging apparatus 110 is configured to wirelessly transmit its acquired image of a respective section of an aircraft 20 to a computer system 102 of the aircraft inspection system 100. The computer system 102 of the aircraft inspection system 100 receives the transmitted image data from each imaging apparatus 110, and includes an application viewer program 104 that when executed by the computer system 102 is configured to generate a display on a display device 106 that displays the received images of sections of the aircraft 20 that were acquired by each imaging apparatus 110. In one exemplary embodiment, the camera or imaging apparatus 110 acquired images of about 200 megapixels. For each of the acquired images, the system functioned to create and cache down-sampled versions of the parent image, each with successively lower levels of detail, which is known as a multi-level bitmap or Mipmap. Where an operator of the inspection system is viewing an entire composite image (i.e. zoomed out), there is no need to provide detail at a level that is greater than the display device's ability to display (e.g. 3840×1940). Due to the large file size of the acquired images, image retrieval and display would be slow. Therefore, the exemplary system calculates, based on the level of digital zoom (and using a focal-length and angle-of-view guide for focal length), the best resolution to retrieve. In the exemplary embodiment of an aircraft inspection system 100 depicted in FIG. 3, the exemplary inspection system comprises an array of four imaging apparatus 110, which when positioned above an aircraft are configured to acquire images of a nose section of a fuselage 22 of an aircraft 20 positioned within the hangar, a forward section of the fuselage 22 of an aircraft 20 positioned within the hangar, and a section of a wing 24 of the aircraft 20 positioned within the hangar. While FIG. 3 depicts four imaging apparatus 110, the optimal number of cameras or imaging apparatus may be determined by factors including the size of the aircraft, the required time to produce a single image, and other factors. For example, if scan-time were not a factor, a single camera may travel along a path guide and acquire images of an aircraft. The application viewer program 104 is configured to generate a display on a display device 106 of each camera image 124a, 124b, 124c, and 124d acquired by each imaging apparatus 110, with the images 124a, 124b, 124c, and 124d of sections of the aircraft 20 from each imaging apparatus 110 arranged in a relative order such that each image is positioned to appear as a merged representation of the aircraft 20, as shown in FIG. 5. The application viewer program 104 may be configured to resize each image 124a, 124b, 124c, and 124d of a section of the aircraft 20 and scale the images to the same relative scale, where the scaled images are registered relative to a common frame of reference and combined together in an arrangement so that the acquired images represent an overhead sectional view of the aircraft. In one exemplary embodiment, the application viewer program 104 may be configured to identify partially overlapping areas in adjacent images 124a, 124b, 124c, and 124d after scaling the images, where the overlapping areas are overlaid or merged, such that the images are combined together to represent an overhead sectional view of the aircraft 20. Where the hangar 32 includes mounted reference markers (such as a reflective target or retroreflector) at known locations, the plurality of imaging apparatus 110 can be localized within the coordinate frame of reference of the hangar 32 to establish known location of each imaging apparatus 110, and the computer system 102 and application viewer program 104 of the aircraft inspection system 100 may transpose the location coordinates for each imaging apparatus 110 from the coordinate frame of reference of the hangar 32 to the local coordinate frame of reference of the aircraft 20, such that the application viewer program of the present inspection system may determine the location of acquired image of a section of the aircraft with respect to the aircraft's coordinate frame of reference (where the coordinate frame of reference of the aircraft may comprise polar coordinate system that defines the contour of the frame sections of the aircraft fuselage, for example).

Figure 6:
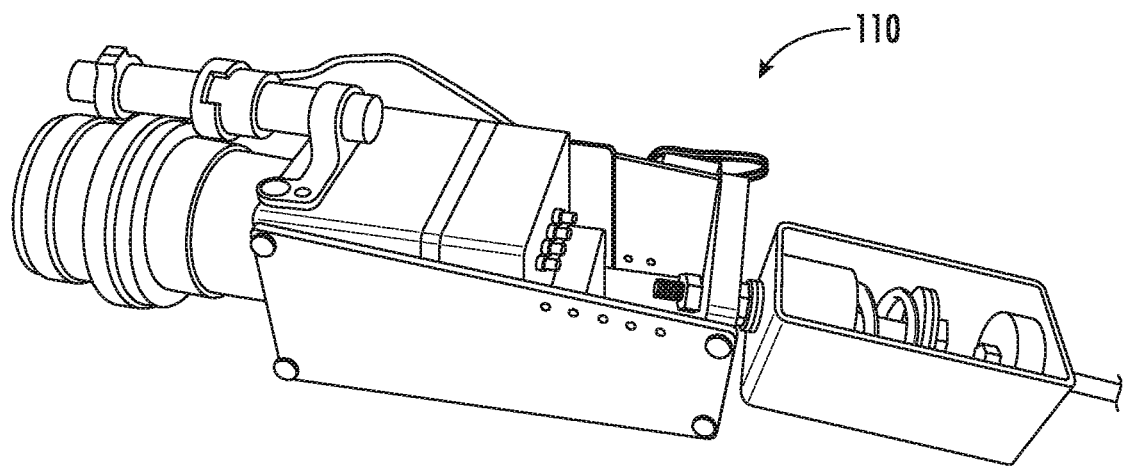
FIG. 6 an illustration of an exemplary embodiment of an imaging apparatus of an inspection system according to the present disclosure.

With reference to FIG. 6, an illustration is shown of the imaging apparatus 110 included in the embodiment depicted in FIGS. 3-5. The imaging apparatus 110, which include an imaging camera 112, which may be a camera such as a VN-200 MX-C30 pixel shifting camera manufactured by Vieworks and sold by Vision Systems Technology, LLC. The imaging apparatus 110 and/or camera 112 includes a controller 114 that may comprise a microprocessor and/or integrated circuit, such as a Complementary Metal Oxide Semiconductor (CMOS) component, and a receiver 115 (or transceiver), for receiving and/or transmitting wireless signals between the imaging apparatus 110 and a computer system 102 of the aircraft inspection system 100. A color CMOS sensor includes a micro-lens array that may employ a repeating Red-Green-Blue pattern known as the Bayer pattern. Since a CMOS component has no wavelength specificity, a color filter array (CFA) imparts wavelength specific information to each of the photo sites or pixels. A raw image acquired in this way can be converted to a full-color image, with intensities of each of the three primary colors (Red, Green, Blue) at each pixel, by applying an interpolation algorithm via a process known as de-mosaicing, or de-Bayering, which can cause a loss in resolution of a color CMOS sensor. By using a pixel-shifting camera, it is possible to produce true color images, and thus eliminate the de-mosaicing interpolation process, and maintain image resolution. The receiver 115 may be a wireless transceiver device configured to receive control signals wirelessly transmitted by the transmitter 108 of the aircraft inspection system 100, and/or to transmit image data to the computer system 102. The imaging apparatus 110 may also transmit image data via coaxial cable or a fiber optic cable to the computer system 102. The imaging apparatus 110 and/or camera 112 includes a lens 116, which may be an 85 degree optic lens, or an 85 millimeter lens manufactured by Nikkor Corporation, for example. In one exemplary embodiment, the imaging apparatus 110 also includes a motor 117 and a wireless transmitter to control the motor 117 for rotating the lens 116 for adjusting the focus of the lens 116. Alternatively, focus of the lens may be controlled by the computer system 102 of the aircraft inspection system 100. Additionally, a secondary motor may be employed for controlling the lens iris (aperture) of the camera 112. This is critical, since the aperture dictates the depth of field, with a smaller f-stop (larger opening for more light) resulting in a shallower depth of field. For aircraft inspection, the intent was to have 12-20 feet for depth of field, which requires operating the cameras at f/5.6 or higher. This range of depth of field means that the upper crown as well as the wing surface could both be in focus simultaneously, which is important for image alignment. The imaging apparatus 110 may comprise a vibration damping mounting assembly 119 comprising a spring having a select spring rate configured to dampen facility-induced vibration that may impact image resolution. The spring absorbs forces associated with vibration from the overhead structure, and dampens vibration to isolate the imaging apparatus from external vibration. The imaging apparatus 110 further includes a power supply system 118, such as a 12 volt direct current power supply, and a CXP (CoaX Express) range extender that is associated with the controller 114. The range extender enables use of a single mode fiber, which allows communication for distances of up to 10 kilometers. Because of the physical properties of coax as well as the high frequencies required for transmission, coax by itself would be limited to about 30 meters. The image data communicated by the controller 114 and CXP range extender program is configured to be transmitted to the computer system 102 or workstation of the aircraft inspection system 100.

With reference to FIG. 5, the images acquired by the plurality of imaging apparatus 110 in the embodiment of an aircraft inspection system 100 shown in FIGS. 1-4 are received by a computer system 102 of the aircraft inspection system 100 on which an application viewer program 104 is configured to generate a display 120 of the images 124a, 124b, 124c, and 124d of sections of the aircraft 20, where each image 124a, 124b, 124c, and 124d acquired by each imaging apparatus 110 is arranged relative to each other in a position corresponding to the location on the aircraft 20 such that the images represent a sectional view of the aircraft 20 as shown in FIG. 5. The display of the multiple acquired images 124a, 124b, 124c, and 124d of different sections of the aircraft 20 may be displayed relative to an icon or indicia representing an aircraft position map key 122, for indicating the various sections of the aircraft 20 for which acquired images are displayed. The aircraft position map key 122 may further include a depiction of rectangles on an aircraft icon, which rectangles represent each of the images 124a, 124b, 124c, and 124d of different sections of the aircraft that were acquired by the plurality of imaging apparatus 110. Each of the rectangles depicted on the aircraft position map key 122 correspond to a section on the aircraft 20 where an imaging apparatus 110 is positioned to acquire an image for display on the display 120.

Figure 7:
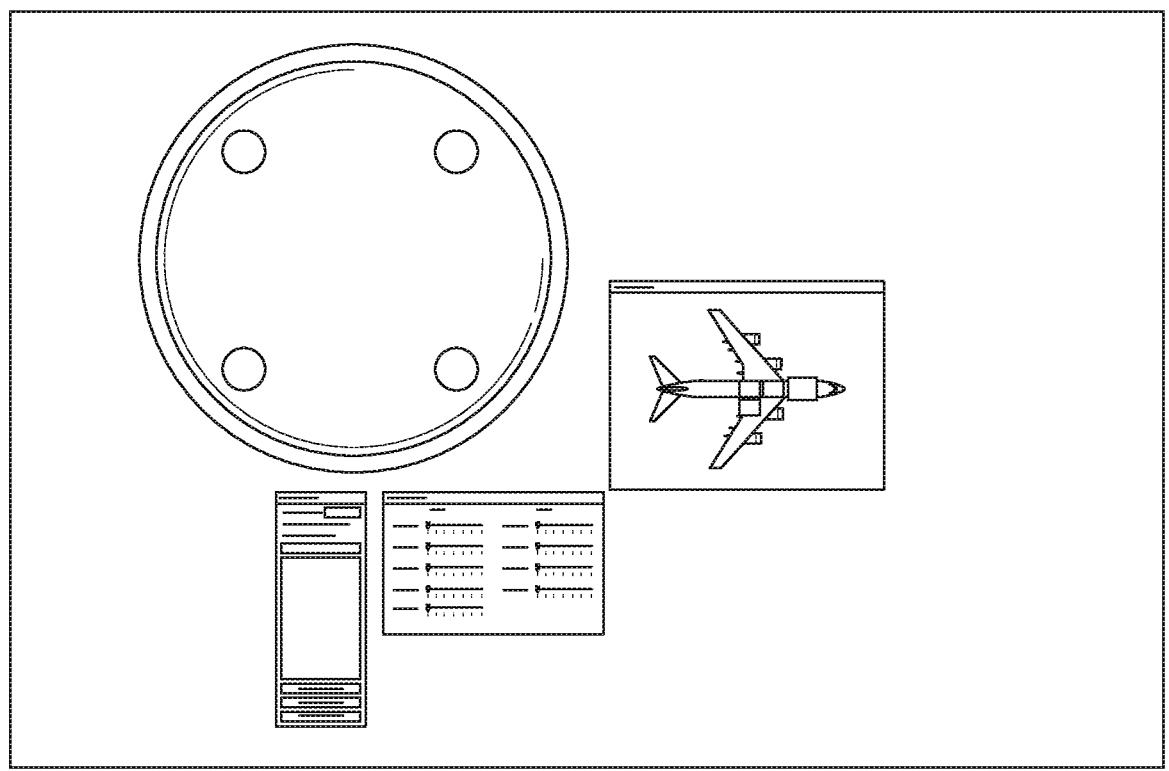
FIG. 7 is an illustration of an aircraft inspection system display of an image acquired by an imaging apparatus of a section of an aircraft and a representation of an aircraft position map key.

In one exemplary embodiment, the application viewer program 104 may be configured to receive input of a selection by a user of an image of a section of the aircraft 20 shown in the display 120 in FIG. 5, and responsively display the image of the selected section of the aircraft 20, as shown in FIG. 7. The application viewer program 104 is configured to display an image of a select section of the aircraft 20, and may generate the display 120 in response to a request to display an image of a select section of the aircraft 20 acquired by a particular imaging apparatus 110. As shown in FIG. 7, the application viewer program 104 is configured to generate the display of an image of a particular section of the aircraft 20 acquired by a particular imaging apparatus 110, along with indicia representing aircraft position map key 122 including a rectangle indicating the relative section of the aircraft 20 corresponding to the acquired image of a particular section of the aircraft 20.

Figure 8:
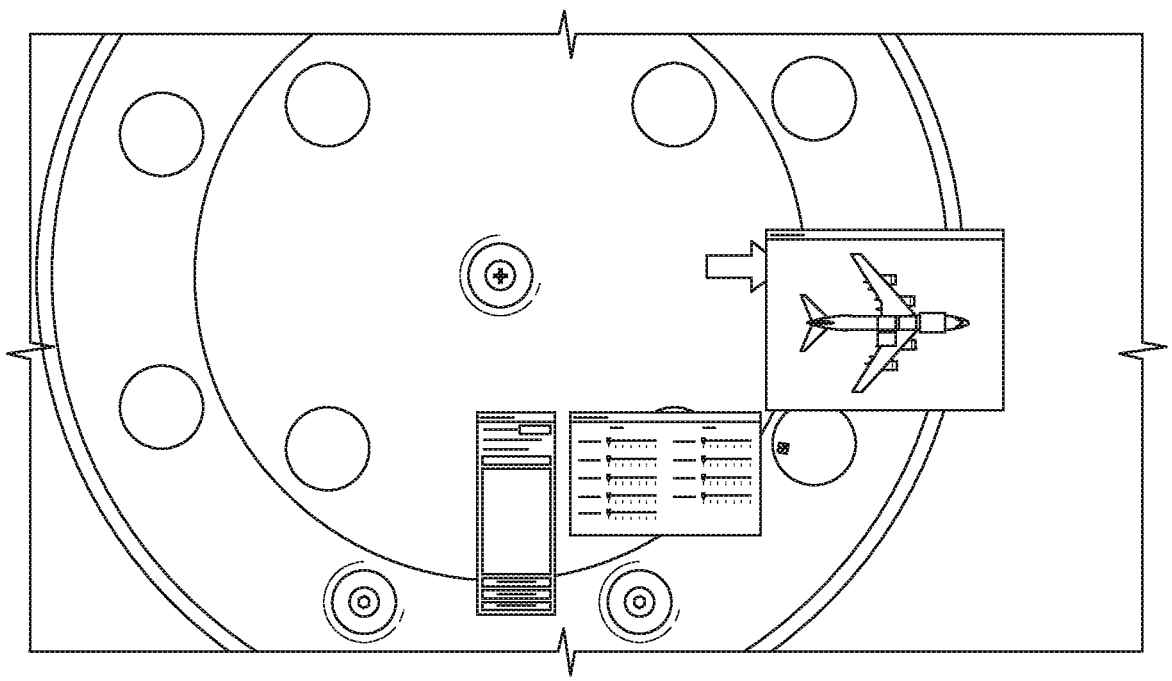
FIG. 8 is an illustration of an aircraft inspection system display of an image acquired by another imaging apparatus and a representation of an aircraft position map key.

The computer system 102 and application viewer program 104 is configured to receive input from a user to select an image (e.g., 124b) of a particular section of the aircraft 20 acquired by a particular imaging apparatus 110, for further viewing, or to acquire a zoomed-in high resolution image of the particular section. Upon input of a selection by a user of an image 124b or section of the aircraft 20, the computer system 102 and/or the application view interface of the aircraft inspection system 100 is configured to process the acquired images to generate a zoomed-in high resolution image of a particular section of the aircraft. Alternatively, the computer system 102 may be configured to transmit a signal command to the respective imaging apparatus 110. The command includes instructions to control the motor 117 for adjusting a focus of a lens 116 on the camera 112 of the imaging apparatus 110. Upon focusing the camera 112 and/or imaging apparatus 110, the computer system 102 may control a transmitter 108 to transmit a signal command instructing the imaging apparatus 110 to acquire a high-resolution image of the section of the aircraft 20. In the example image in FIG. 7, the displayed image is of a particular forward section of the fuselage 22 of the aircraft 20 that includes an Iridium antenna program mounted on the top surface of the aircraft 20. In the example image in FIG. 8, the displayed image is of an ACSS communication module mounted on the top surface of the fuselage 22 of the aircraft 20.

Accordingly to another aspect of the present disclosure, the imaging apparatus 110 further includes a controller 114 for enabling acquisition of shifted images. For each imaging apparatus 110 including an imaging camera 112, such as a VN-200MX-C30 pixel-shifting camera. The imaging apparatus 110 and/or camera 112 is configured to acquire image data, and to use a subroutine via a controller 114, such as an, integrated circuit or complimentary metal oxide semiconductor (CMOS), which is configured to perform image processing where image data is shifted at least one pixel with each shifted image, to produce a number of shifted images. The integrated circuit or CMOS may include an alternate subroutine that calculates translation values for each pixel in each successive image shift, so that image data is shifted a predetermined number of pixels with each shifted image, where shifting a predetermined number of pixels was shown to enhance resolution and to enable producing enhanced super resolution, true RGB images.

Figure 9:
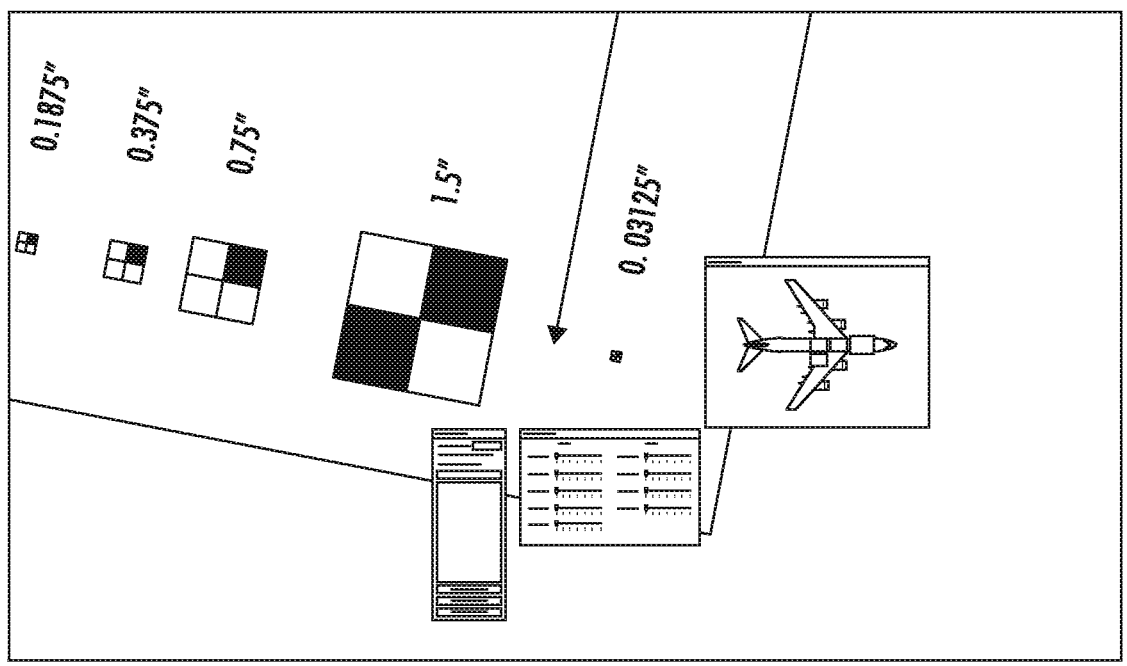
FIG. 9 is an illustration of an aircraft inspection system display of an image acquired by an imaging apparatus of a section of an aircraft where potential damage has been identified.

Accordingly to another aspect of the present disclosure, the application viewer program 104 may be configured to perform image processing, using object detection techniques to identify within the images (e.g. image 124d) one or more reference markers on the aircraft 20. The one or more reference markers provide identification a known location on the aircraft 20, with known coordinates relative to the aircraft 20. The reference marker may be any type of indicator or object that may adhere or otherwise attach to the aircraft 20, such as, for example, a sticker or retro-reflector that may have a known size and coordinate location. Alternatively, the application viewer program 104 may be configured to use object detection techniques to identify within the images (e.g. image 124d) one or more exterior features on the aircraft 20. Examples of exterior features on an aircraft 20 include, but are not limited to, windows, doors, outlets, painted markers or logos, and rivets. The computer system 102 of the aircraft inspection system 100 is configured to transmit a signal command to one or more of the imaging apparatus 110, where the command includes instructions to control the motor 117 for adjusting a focus of a lens 116 on the imaging camera 112. Upon focusing the imaging apparatus 110 and/or camera 112, the computer system 102 and application viewer program 104 transmits a signal command instructing the imaging apparatus 110 to acquire a high-resolution image of a section of the aircraft 20, where the image may be acquired for a particular location on the aircraft 20 relative to a particular identified reference marker or external feature on the aircraft 20 having known location coordinates. In one exemplary embodiment, the computer system 102 and application viewer program 104 transmit a signal command instructing the imaging apparatus 110 to control a motor 117 to focus a lens 116 of the imaging apparatus 110 to acquire a high-resolution image for a particular location on the aircraft 20 nearest to a particular reference marker or known feature, where potential damage 130 has been identified on the surface of the aircraft 20, as shown in FIG. 9. The potential damage 130 may be identified through image processing and object detection, either by detection of a local anomalies in the image (e.g. image 124d) of an outer surface of the aircraft 20, or by comparison of the acquired image to a reference image for the particular section of the aircraft 20 to determine whether any visible difference is present between the acquired image and the reference image. Alternatively, the potential damage 130 may be identified by visual inspection by an operator reviewing the acquired images (e.g. image 124d) or surface of the aircraft 20. The identification of the potential damage 130 may also include identification of the location coordinates of the damage 130 relative to an identified reference marker on the aircraft 20. The computer system 102 and application viewer program 104 may also be configured to access a database that includes information pertaining to the various types of damage which may be unacceptable on the outer surface of the aircraft 20, which define a maximum allowable size of damage that may be acceptable on an exterior aircraft surface. The application viewer program 104 may perform image processing on the acquired image (e.g. image 124d) of a section of the aircraft 20 that may include the identified damage 130 or affected area, as well as a reference marker associated with positional information on the aircraft 20. The affected area of the aircraft 20 represents the damaged portion of the aircraft 20 (i.e., a dent, buckle, indentation, etc.).

Figure 12:
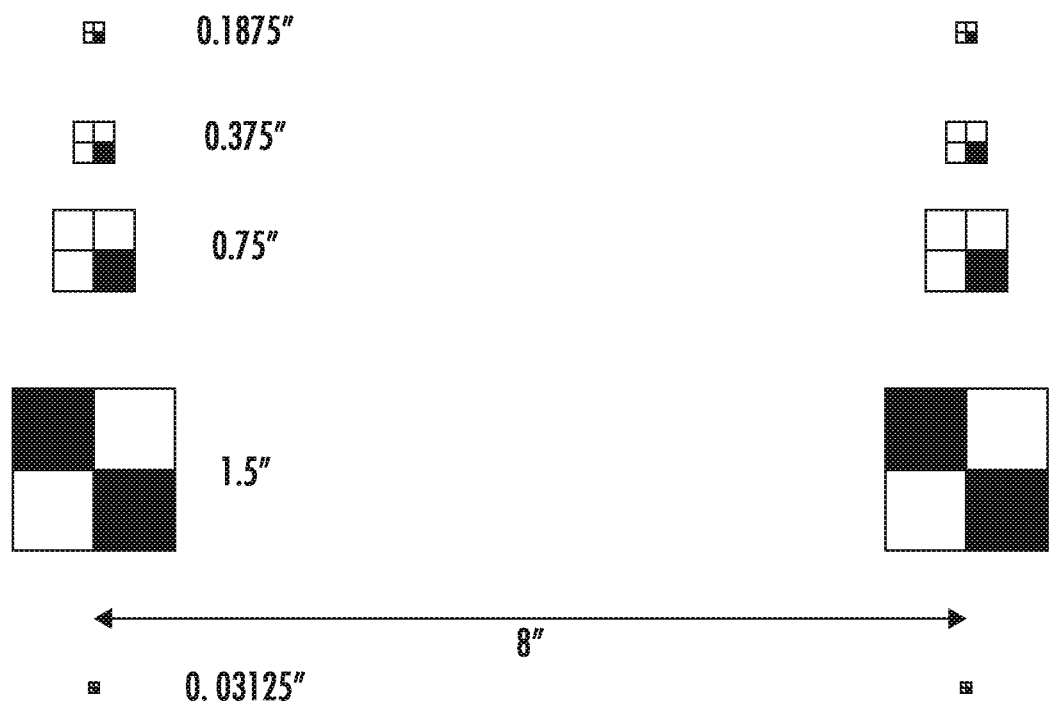
FIG. 12 is an illustration of an image of a reference resolution chart in accordance with the present disclosure.
Figure 13:
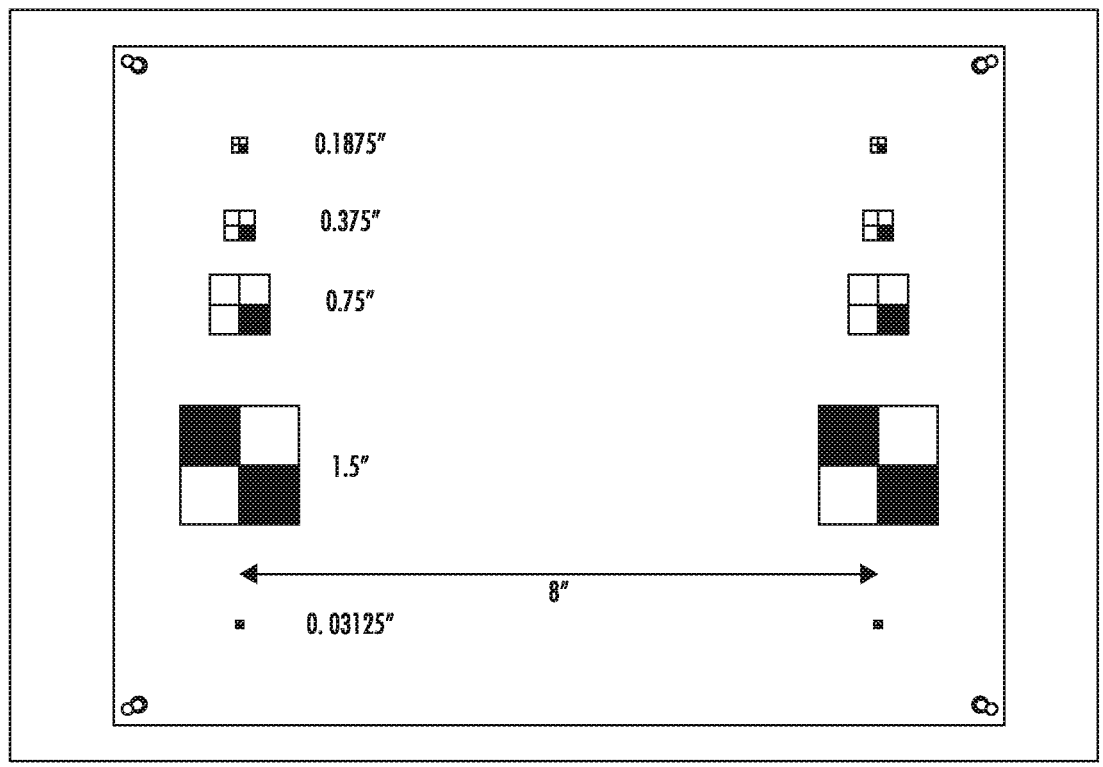
FIG. 13 is an illustration of an aircraft inspection system display of an image of a reference resolution chart where the image is a demosaiced image processed by the aircraft inspection system in accordance with the present disclosure.
Figure 14:
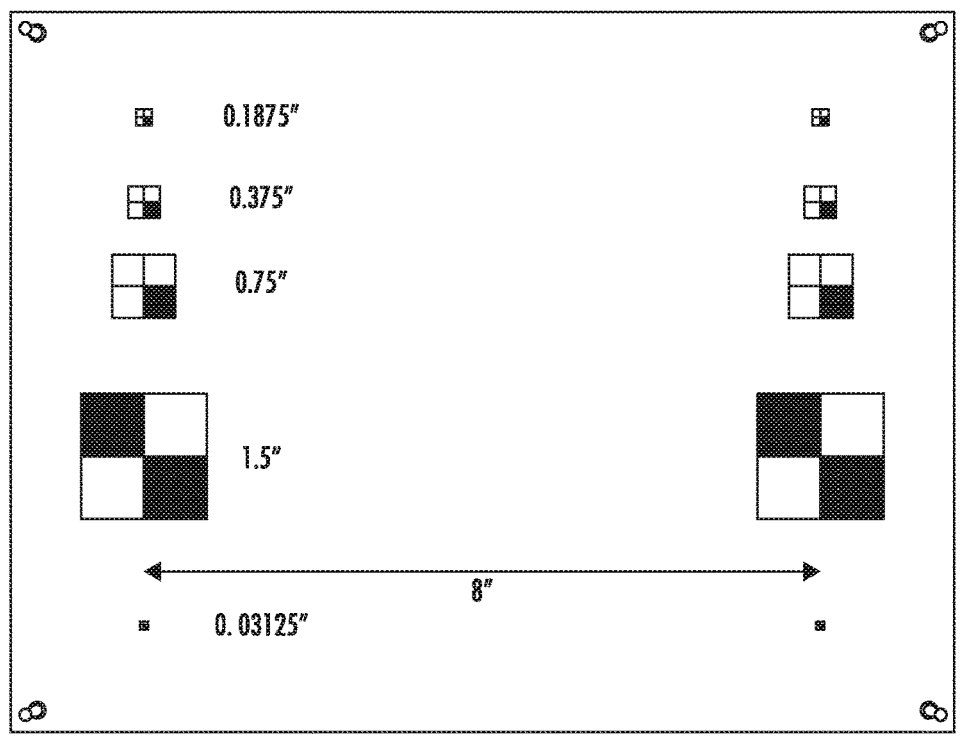
FIG. 14 is an illustration of an aircraft inspection system display of the demosaiced image in FIG. 13 following a post super-resolution process performed by the aircraft inspection system in accordance with the present disclosure.

According to another aspect of the present disclosure, the imaging apparatus 110 and imaging camera 112 include an integrated circuit that is configured to perform post-processing of the acquired image of a section of the aircraft, where the section may include potential damage 130 such as a small dent. In the exemplary inspection systems, the imaging camera 112 is a pixel shifting camera, which includes a sensor that is affixed to a translatable, piezo-electrically controlled platen. When the camera receives a signal from the computer system 102 to acquire an image, the camera acquires up to sixteen images, one at the "home" position, and the others translated both horizontally and vertically around the "home" and all of the images (RAW) are sent back to the computer system 102 where they are processed. However, a pixel shifting camera's resolution is limited to situations where the object is completely stationary relative to the camera. In the exemplary inspection systems, the pixel shifting cameras mounted to overhead structure or ceiling trusses of a hangar experienced continuous vibration. This problem was overcome by collecting a series of images with the pixel-shifting camera, and using feature-based image alignment and registration techniques, operating in the Bayer method space, to find the homography. We then use homography interpolation to produce a true color super-resolution frame. It should be noted that by using this process, it is possible to obtain super-resolution images even without a pixel-shifting camera. To illustrate the enhanced image super resolution process, a resolution chart reference 132 is placed on the surface of the aircraft 20, where the resolution chart reference 132 includes a number of target patterns of predetermined sizes that may represent a damage defect. FIG. 13 and FIG. 14 show two comparative images collected through the imaging apparatus 110 of the present system, with the VN-200MX-C30 pixel shifting camera and a 85 degree focal length lens 116. One example of a reference resolution chart 132 is shown in FIG. 12. FIG. 13 represents a demosaiced, 47.8 MegaPixel image, while FIG. 14 shows the exact same image following a post super-resolution process. Because the super-resolution image is true RGB and does not require mosaic filtering to estimate color for each pixel, each pixel is natively articulate. The representation of a 0.0312 inch defect is given by the box at the bottom of each image in FIG. 13 and FIG. 14. With regard to the clarity of the super resolution image, its clarity can be increased with a narrower field-of-view lens, while not sacrificing much regarding field of view.

Figure 10:
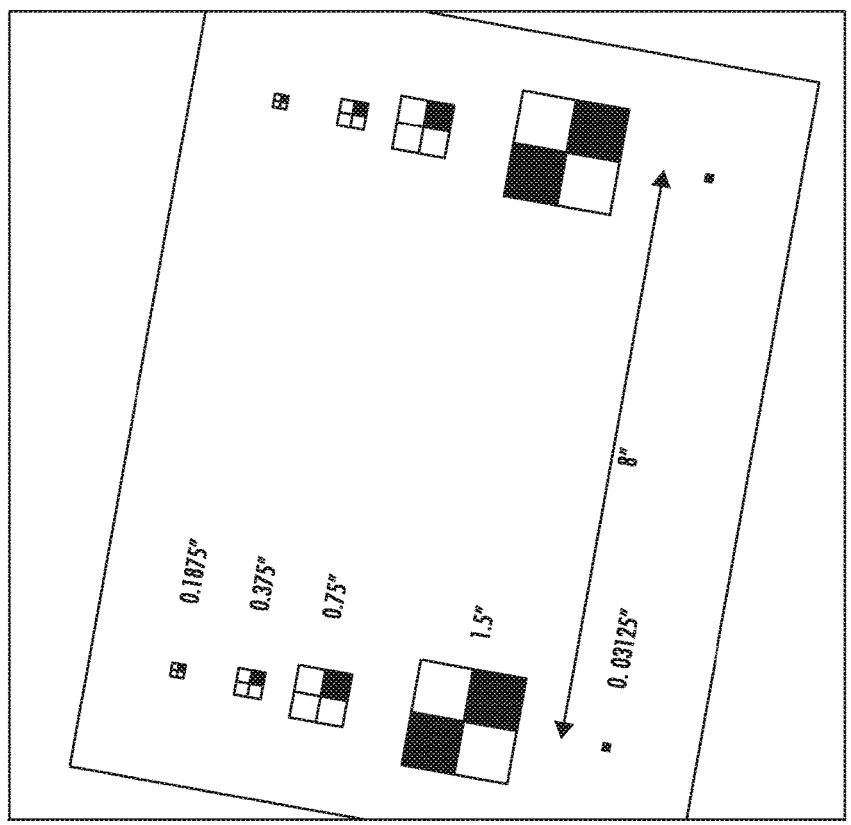
FIG. 10 is an illustration of an aircraft inspection system display of an image of a reference resolution chart positioned on a section of an aircraft where potential damage may be present.
Figure 11:
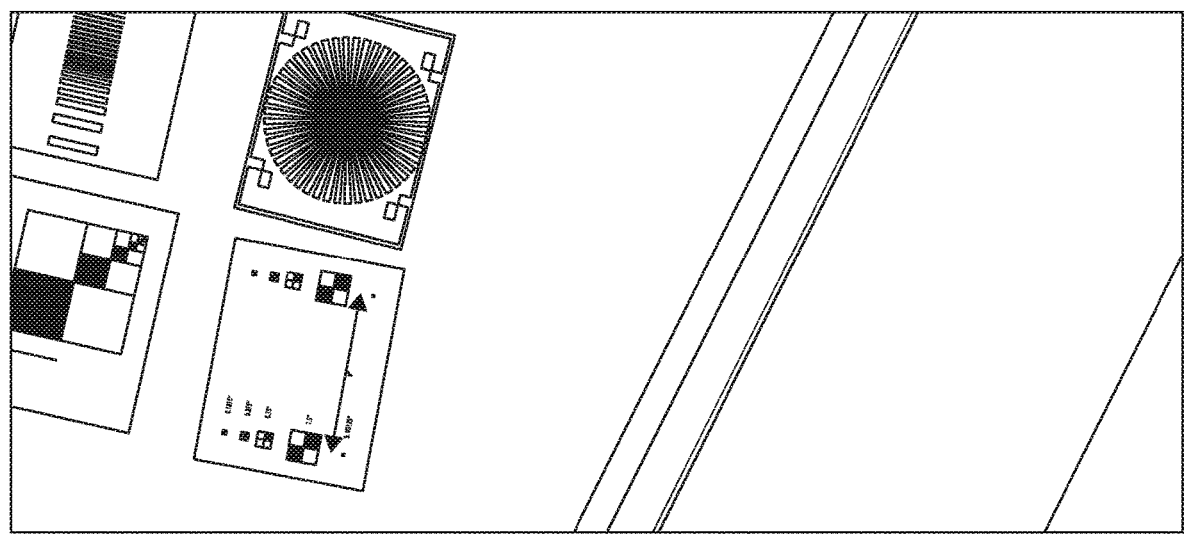
FIG. 11 is an illustration of an aircraft inspection system display of an image of a number of reference resolution charts on a wing section of an aircraft.

According to another aspect of the present disclosure, the computer system 102 and imaging apparatus 110 may be configured to acquire, for a new aircraft, images of sections of the aircraft that are stored as baseline reference images, where the application viewer program 104 is configured to compare subsequently acquired images of the aircraft (obtained during service) to the baseline reference images for detecting areas on the aircraft having potential damage 130. The application viewer program 104 may be configured to further determine an estimated size of the identified potential damage 130 (such as a small dent depicted in FIG. 10), and may further determine an x-coordinate and a y-coordinate position of the identified damage 130 relative to a reference marker. The computer system 102 and application viewer program 104 may be configured to determine the size of the identified damage 130 (or dent) from the acquired image by comparison to a resolution chart reference 132 that is also in the acquired image. Referring to FIG. 10, an illustration is shown of zoomed-in high resolution image acquired of a section of the aircraft 20 that includes the identified damage 130, where the image also includes a resolution chart reference 132 or marker pattern. Referring to FIG. 11, an illustration is shown including an image acquired of a section of the aircraft 20 that includes the identified damage 130 and also includes a number of different chart references or marker patterns. The application viewer program 104 performs image processing to identify a location with potential damage 130 (or a user identifies the damage by review of the acquired image). The size of the damage 130 or affected area may be determined based on known fiducials such as rivets and labels on the aircraft, as well as parameters such as the working distance for the cameras. Upon identifying the potential damage 130 on the aircraft 20 and determining its estimated size, where the estimated size of the damage exceeds a predetermined threshold the application viewer program 104 is configured to generate an output to a display device 106 of an instruction, the displayed instruction specifying that the damage needs to be repaired before further flight operation of the aircraft 20. Accordingly, the aircraft inspection system 100, which comprises the computer system 102 and application viewer module 104 configured to receive images of sections of the aircraft from multiple imaging apparatus 110 (that are scaled, registered and aligned or merged) and configured to generate a display 120 of the images in an arrangement representing a sectional view of the aircraft along with an aircraft position map key 122, is configured to enable identification of potential damage and estimate the size of damage to provide improved inspection of an aircraft that may require repair before continued operation.

Figure 15:
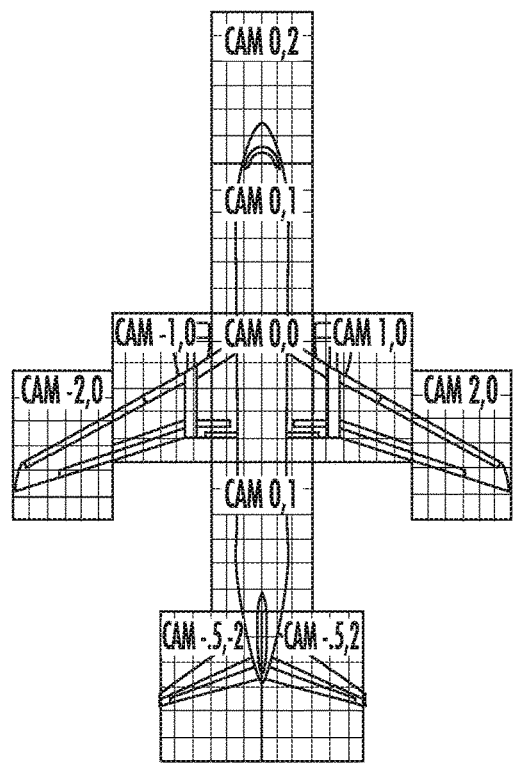
FIG. 15 is an illustration of an aircraft inspection system with a plurality of imaging apparatus that are moveably positionable on an overhead structure in an aircraft hangar in which an aircraft is positioned.

Referring to FIG. 15, an illustration is shown of another example embodiment of an aircraft inspection system 100 with a plurality of imaging apparatus 110 that are moveably positionable on an overhead structure in an aircraft hangar in which an aircraft 20 is positioned. Each of the imaging apparatus 110 are positionable relative to the aircraft 20 and each other to capture overhead images of different sections of an aircraft 20 such that a minimum amount of overlap exists in the images of different sections of the aircraft 20 that is acquired by the imaging apparatus 110. The aircraft inspection system 100 preferably comprises an array of a plurality of imaging apparatus 110, positioned to acquire images of a forward nose section of a fuselage of an aircraft 20 positioned within the hangar, a forward section of the fuselage of the aircraft 20, a starboard wing section and port wing section of the aircraft 20, an aft section of the fuselage of the aircraft 20, and a tail empennage of the aircraft 20. In this example of an embodiment of an aircraft inspection system 100 comprises an application viewer program 104, which is configured to generate a display on a display device 106 of each camera image acquired by each imaging apparatus 110 of sections of the aircraft 20, arranged in a relative order such that each image is positioned to appear as a merged representation of the aircraft 20. Such an aircraft inspection system 100 having an arrangement of a plurality of imaging apparatus 110 can provide enhanced image acquisition and inspection of an entire aircraft 20, for identification of damage on an affected area of the aircraft 20.

Figure 16:
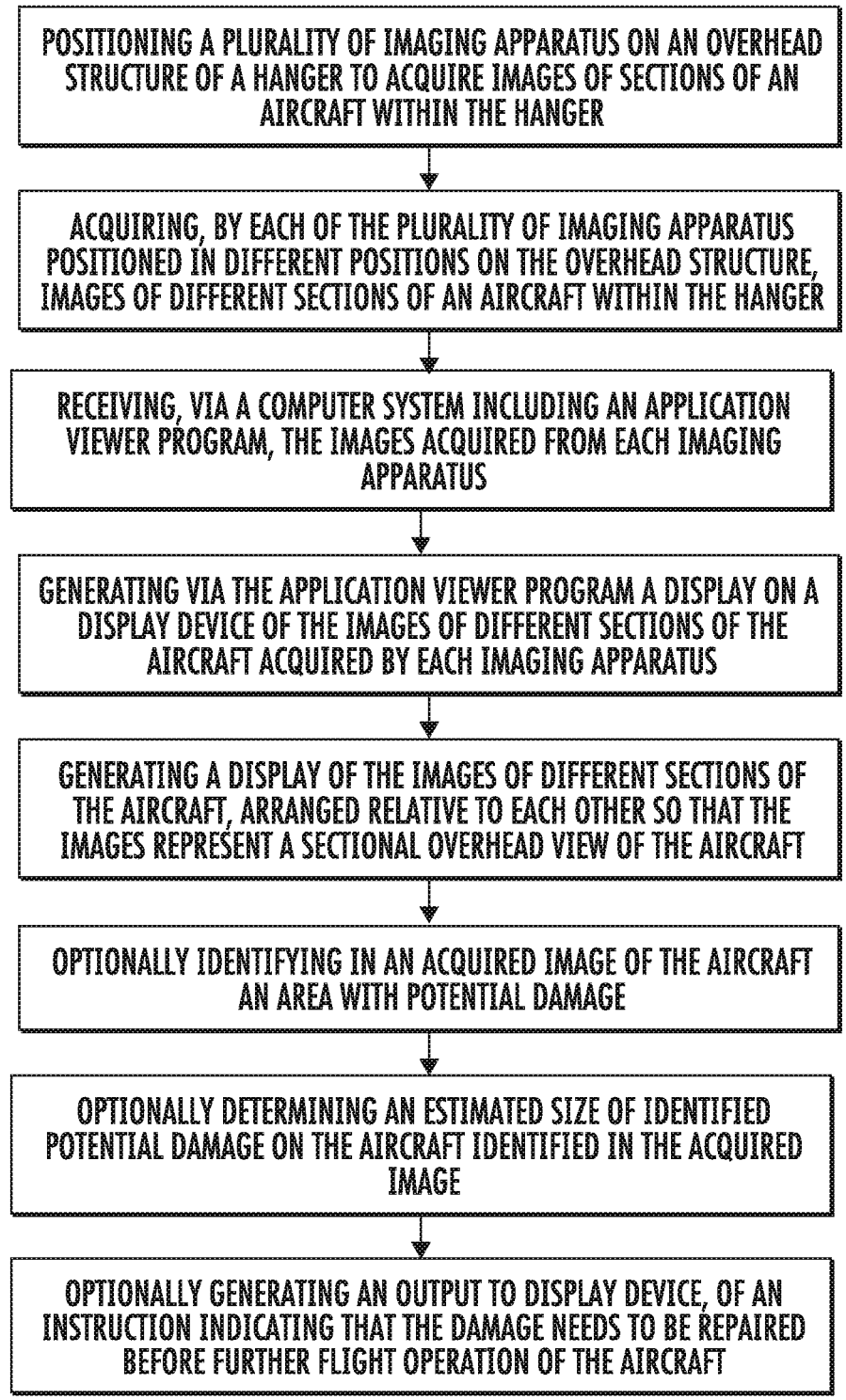
FIG. 16 is an illustration of a method for aircraft inspection system using a plurality of imaging apparatus in accordance with the present disclosure.

According to another aspect of the present disclosure a method is provided for inspection and acquiring images of an aircraft within a space, as shown in FIG. 16. The method includes the steps of positioning a plurality of imaging apparatus on an overhead structure in a ceiling space of an aircraft hangar, each imaging apparatus being mounted to a movable support that is movably positionable on the overhead structure in a ceiling space in an aircraft hangar. The method includes acquiring, by each of the plurality of imaging apparatus movably positioned on different positions on the overhead structure, images of different sections of an aircraft within the hangar, receiving, via a computer system including an application viewer program, the images acquired from each imaging apparatus, and generating via the application viewer program a display on a display device of the images of different sections of the aircraft acquired by each imaging apparatus. The step of generating the display includes generating a display of the images of different sections of the aircraft that are arranged relative to each other such that the images represent a sectional overhead view of the aircraft. The method for inspection and acquiring images of an aircraft may further comprise the additional step of generating a display of the images of different sections of the aircraft acquired by the plurality of imaging apparatus along with a depiction representing an aircraft position map key indicating the relative sections of the aircraft corresponding to the images acquired by the imaging apparatus.

In the exemplary embodiment of a method for inspection and acquiring images of an aircraft within a space, the step of positioning a plurality of imaging apparatus comprises positioning at least four imaging apparatus at a predetermined spacing relative to each other such that a minimum amount of overlap exists in the images of different sections of the aircraft that each imaging apparatus acquires. The step of positioning a plurality of imaging apparatus preferably comprises positioning at least four imaging apparatus at a predetermined spacing relative to each other such that a minimum amount of overlap exists in the images of different sections of the aircraft that each imaging apparatus acquires.

The method for inspection and acquiring images of an aircraft may further comprise the additional step of receiving an input of a selection associated with a particular section of the aircraft, and responsively sending a command to a particular imaging apparatus that includes instructions to control a motor for adjusting focus of a lens on a camera of the imaging apparatus to acquire a high-resolution image of the particular section of the aircraft in which potential damage is detected. The method may further comprise the step of determining, via the computer system and application viewer program, an estimated size of the potential damage on the aircraft identified in the acquired image, wherein if the estimated size of the damage exceeds a predetermined threshold the method further comprises the step of generating, via the application viewer program, an output to a display device of an instruction indicating that the damage needs to be repaired before further flight operation of the aircraft.

In the exemplary embodiment of a method for inspection and acquiring images of an aircraft within a space, the method may further comprise the step of executing, via an imaging apparatus having a controller including an integrated circuit, a sub-routine that controls the operation of the camera of the imaging apparatus and processing of acquired images such that image data is shifted a predetermined number of pixels with each shifted image, to account for facility-induced vibration or low frequency oscillations. The method may further include the step of performing a post-processing of the acquired image using a super-resolution process to enhance the resolution of the acquired image of a section of the aircraft, where the section may include potential damage such as a small dent. Performing the super-resolution process may entail positioning a resolution chart reference on a surface of the aircraft, where an image is acquired of the resolution chart reference by an imaging apparatus and processed to obtain a demosaiced image.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An inspection system for acquiring images of an aircraft in a space comprising:
   a plurality of imaging apparatuses positionable on an overhead structure in a ceiling space of an aircraft hangar, each imaging apparatus being positioned within the aircraft hangar such that each of the plurality of imaging apparatuses are configured to acquire images of sections of an aircraft positioned within a space; and
   a computer system including an application viewer program, configured to receive the acquired images from each imaging apparatus, wherein the application viewer program is configured to generate a display on a display device of the images acquired by each imaging apparatus of different sections of the aircraft, and
   wherein the computer system and the application viewer program are configured to generate the display of the images of the different sections of the aircraft from the plurality of imaging apparatuses, with the images arranged relative to each other so that the images represent a sectional view of the aircraft.

2. The system of claim 1, wherein the computer system and the application viewer program are configured to generate the display of the images of the different sections of the aircraft acquired by the plurality of imaging apparatuses along with a depiction representing an aircraft position map key indicating the different sections of the aircraft that correspond to the images acquired by each of the imaging apparatus.

3. The system of claim 2, wherein the computer system and the application viewer program are further configured to generate another display of an image of a particular section of the aircraft acquired by a particular imaging apparatus along with a depiction representing an aircraft position map key indicating a relative section of the aircraft corresponding to the image acquired by the particular imaging apparatus.

4. The system of claim 1, wherein each of the plurality of imaging apparatuses are mounted to a movable support that is movably positionable on the overhead structure in a ceiling space of a hangar, to enable each of the imaging apparatus to be movably positioned relative to each other such that the plurality of imaging apparatuses are configured to acquire images of sections of an upper side of an aircraft within the hangar in which the sections overlap each other.

5. The system of claim 1, wherein the plurality of imaging apparatuses comprise at least four imaging apparatus positioned at a predetermined spacing relative to each other such that a minimum amount of overlap exists in the images of different sections of the aircraft that each imaging apparatus acquires.

6. The system of claim 5, wherein the computer system and the imaging apparatus are configured to acquire, for a new aircraft, the images of sections of the aircraft that are stored as baseline reference images, and the application viewer program is configured to compare subsequently acquired images of the aircraft to the baseline reference images for detecting areas on the aircraft with potential damage.

7. The system of claim 5, wherein the plurality of imaging apparatuses comprise an array of at least four imaging apparatuses, positioned at a minimum spacing to acquire images of a forward nose section of an aircraft within a hangar, a forward section of a fuselage of the aircraft within the hangar, a section of the fuselage adjoining a wing of the aircraft within the hangar, and a wing section adjoining the fuselage of the aircraft within the hangar.

8. The system of claim 1, wherein the computer system is configured, responsive to an input of a selection associated with a particular section of the aircraft, to process the acquired images to obtain a high-resolution image of the particular section of the aircraft.

9. The system of claim 8, wherein the computer system is configured to generate instructions to control a motor for adjusting focus of a lens on a camera of the imaging apparatus to acquire the high-resolution image of the section of the aircraft in which damage is detected.

10. The system of claim 8, wherein the computer system and the application viewer program are configured to determine, for an image of the particular section of the aircraft in which potential damage is identified, an estimated size of the potential damage on the aircraft identified in the acquired image, wherein if the estimated size of the potential damage exceeds a predetermined threshold the application viewer program is configured to generate an output to the display device of an instruction indicating that the damage needs to be repaired before further flight operation of the aircraft.

11. The system of claim 1, wherein the imaging apparatus includes a controller having an integrated circuit, which includes a sub-routine that controls operation of a camera of the imaging apparatus and processing of the acquired images such that image data is shifted a predetermined number of pixels with each shifted image, to enable producing enhanced super resolution, true RGB images.

12. The system of claim 1, wherein one of the computer system and the plurality of imaging apparatuses including a controller with an integrated circuit are configured to perform post-processing of the images acquired by the imaging apparatus to generate a zoomed-in high resolution image of a particular section of the aircraft.

13. An inspection system for acquiring images of an aircraft in a space comprising:
a plurality of imaging apparatuses positionable on an overhead structure in a ceiling space of an aircraft hangar, each imaging apparatus being positioned within the aircraft hangar such that each of the plurality of imaging apparatuses are configured to acquire images of sections of an aircraft positioned within a space; and
a computer system including an application viewer program, configured to receive the acquired images from each imaging apparatus, wherein the application viewer program is configured to generate a display on a display device of the images acquired by each imaging apparatus of different sections of the aircraft, and
wherein the computer system and the application viewer program are configured to generate the display of the images of the different sections of the aircraft acquired by the plurality of imaging apparatuses, with the images of different sections arranged in a layout that merges the images in a manner that represents a depiction of a sectional view of the aircraft.

14. A method for inspection and acquiring images of an aircraft within a space, comprising the steps of:
positioning a plurality of imaging apparatuses on an overhead structure in a ceiling space of a hangar, each imaging apparatus being positioned within the ceiling space in the hangar such that each of the plurality of imaging apparatuses are configured to acquire images of sections of an aircraft positioned within the hangar;
acquiring, by each of the plurality of imaging apparatuses positioned in different positions on the overhead structure, images of different sections of an aircraft within the hangar;
receiving, via a computer system including an application viewer program, the images acquired from each imaging apparatus; and
generating via the application viewer program a display on a display device of the images of different sections of the aircraft acquired by each imaging apparatus,
wherein generating the display includes generating a display of the images of different sections of the aircraft that are arranged relative to each other such that the images represent a sectional overhead view of the aircraft.

15. The method of claim 14, further comprising the step of generating the display of the images of different sections of the aircraft acquired by the plurality of imaging apparatuses along with a depiction representing an aircraft position map key indicating the sections of the aircraft corresponding to the images acquired by the imaging apparatus.

16. The method of claim 15, wherein the step of positioning the plurality of imaging apparatuses comprises positioning at least four imaging apparatuses at a predetermined spacing relative to each other such that a minimum amount of overlap exists in the images of different sections of the aircraft that each imaging apparatus acquires.

17. The method of claim 16, further comprising the step of receiving an input of a selection associated with a particular section of the aircraft, and responsively perform post-processing of the acquired images to generate a zoomed-in high-resolution image of the particular section of the aircraft in which potential damage is detected.

18. The method of claim 17, wherein the method further comprises determining, via the computer system and the application viewer program, an estimated size of the potential damage on the aircraft identified in the acquired image, wherein if the estimated size of the damage exceeds a predetermined threshold the method further comprises the step of generating, via the application viewer program, an output to a display device of an instruction indicating that the damage needs to be repaired before further flight operation of the aircraft.

19. The method of claim 16, further comprising the step of executing, via an imaging apparatus having a controller including an integrated circuit, a sub-routine that controls operation of a camera of the imaging apparatus and processing of the acquired images such that image data is shifted a predetermined number of pixels with each shifted image, to enable producing enhanced super resolution, true RGB images.

20. The method of claim 16, further comprising the step of acquiring, for a new aircraft, the images of sections of the aircraft that are stored as baseline reference images, and
comparing via the application viewer program subsequently acquired images of the aircraft to the baseline reference images for detecting areas on the aircraft with potential damage.

\* \* \* \* \*